US011557082B2

(12) United States Patent
Hunt et al.

(10) Patent No.: US 11,557,082 B2
(45) Date of Patent: Jan. 17, 2023

(54) POURABLE SMART MATTER

(71) Applicant: Intel Corporation, Santa Clara, CA (US)

(72) Inventors: Simon Hunt, Naples, FL (US); Mark E. Scott-Nash, Boulder, CO (US)

(73) Assignee: Intel Corporation, Santa Clara, CA (US)

( * ) Notice: Subject to any disclaimer, the term of this patent is extended or adjusted under 35 U.S.C. 154(b) by 1876 days.

(21) Appl. No.: 15/087,264

(22) Filed: Mar. 31, 2016

(65) Prior Publication Data
US 2017/0284797 A1 Oct. 5, 2017

(51) Int. Cl.
*G06T 17/00* (2006.01)
*G01F 17/00* (2006.01)

(52) U.S. Cl.
CPC ............ *G06T 17/00* (2013.01); *G01F 17/00* (2013.01)

(58) Field of Classification Search
CPC ................................ G06T 17/00; G01F 17/00
See application file for complete search history.

(56) References Cited

U.S. PATENT DOCUMENTS

| 2011/0194230 A1* | 8/2011 | Hart | H04M 1/185 361/437 |
| 2011/0199228 A1* | 8/2011 | Roddy | E21B 43/25 340/856.4 |
| 2013/0250845 A1* | 9/2013 | Greene | H04B 7/15507 343/720 |
| 2015/0145831 A1* | 5/2015 | Li | G06F 3/0421 345/175 |
| 2016/0018383 A1* | 1/2016 | Radjy | G01N 33/383 73/53.01 |
| 2016/0291731 A1* | 10/2016 | Liu | G06F 3/044 |

OTHER PUBLICATIONS

Triantafillou, nanoPeer Network and P2P Worlds (Year: 2003).*
InvenSense, Motion Sensors Introduction (Year: 2011).*

* cited by examiner

*Primary Examiner* — Michael P Nghiem
*Assistant Examiner* — Dacthang P Ngo
(74) *Attorney, Agent, or Firm* — Patent Capital Group

(57) ABSTRACT

There is disclosed in an example, a pourable smart matter having a plurality of compute nodes, the compute nodes having: a mechanical structure having a plurality of faces, the faces having abutting face detectors; a network interface; and one or more logic elements comprising a positional engine to: identify a neighbor compute node abutting at least one of the faces; and build an individual positional profile based at least in part on the identifying. The pourable smart matter may be used, for example, to determine the geometry or volume of a container.

23 Claims, 12 Drawing Sheets

POURABLE SMART MATTER

FIELD OF THE SPECIFICATION

This disclosure relates in general to the field of materials science, and more particularly, though not exclusively, to a pourable smart matter.

BACKGROUND

Two-dimensional and three dimensional surfaces may have irregular geometries. In some cases, it is difficult to measure those geometries, or the volume of a container.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1A:
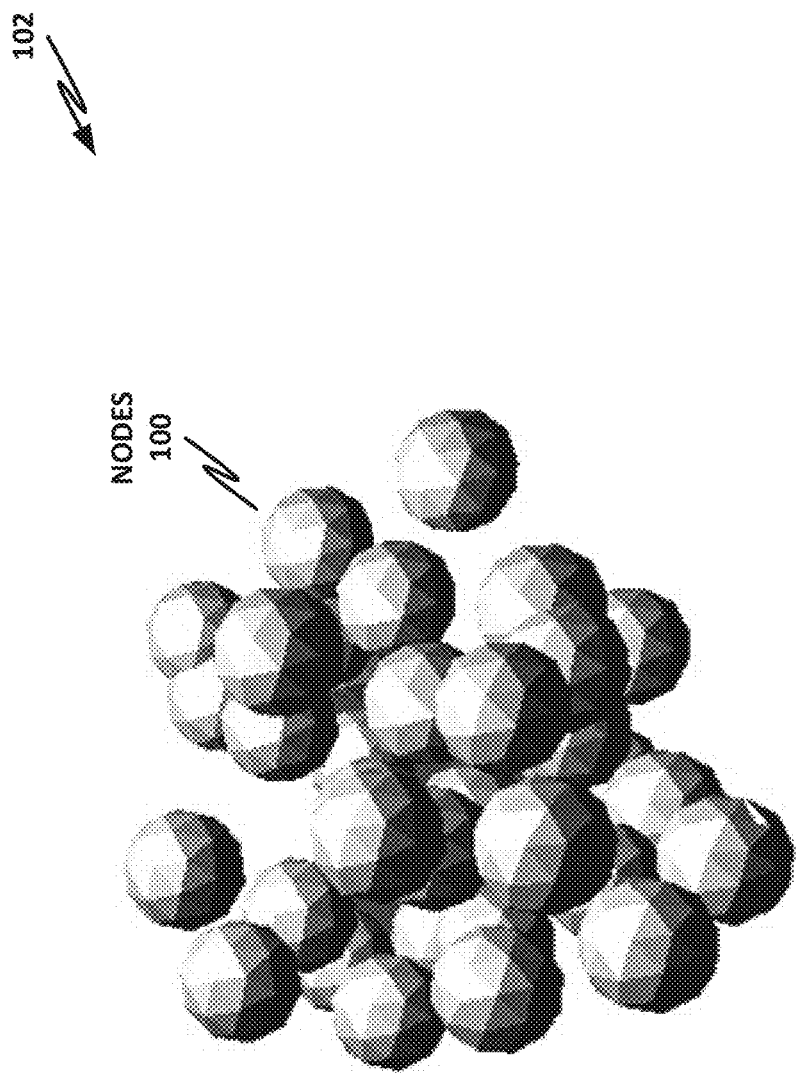
FIG. 1a is a perspective view of a pourable smart matter having a plurality of compute nodes.

There is disclosed in an example, a pourable smart matter having a plurality of compute nodes, the compute nodes having: a mechanical structure having a plurality of faces, the faces having abutting face detectors; a network interface; and one or more logic elements comprising a positional engine to: identify a neighbor compute node abutting at least one of the faces; and build an individual positional profile based at least in part on the identifying. The pourable smart matter may be used, for example, to determine the geometry or volume of a container.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Three-dimensional scanning and analysis of complex geometries, such as the interior of parts, pipework, manifolds, or storage tanks, is a complex process.

To provide just one example, in hydraulic fracturing ("fracking"), well bores may be hundreds of feet long, may reach underground tens or hundreds of feet, and may have irregular geometries (such as in horizontal drilling, where a well bore is first dug downward, and then parallel to the plane of the earth to better reach mineral reserves. Measuring the geometry and volume of such well bores can be a monumental task.

This specification provides a "pourable smart matter" comprising n "grains" of tessellatable compute nodes. The grains are referred to as "tessellatable," meaning that their surfaces are such that they tessellate when the smart matter is poured. Tessellatable surfaces are only one possibility, however. In other examples, the grains may have other shapes, such as spherical, that are not strictly tessellating. In a case such as a sphere, where the nodes do not have flat faces, discrete "faces" may nevertheless be defined on certain discrete portions of the sphere.

Each compute node is provided with an embedded processor, memory, and sensors. The sensors may include a one, two, or three-axis accelerometer, compass, gaussmeter, gyroscope, or other sensor or combination of sensors for detecting the device's orientation with respect to the container, and in particular for detecting which way is "up" (i.e., away from the center of gravity). The sensors may also include face sensors that are configured to detect abutting faces of neighboring compute nodes. As used throughout this specification, an "abutting" face, with respect to a reference face, should be understood to include any face of any neighboring compute node that is touching or is a next-nearest face to the reference face. Thus, with tessellating solids, when one node senses that another node's face is touching its own face f, or that no node is touching face f, but that the other node's face is the next nearest face, that face is said to abut face f. Such detection may be provided by two-way communication between the nodes, electrical conductivity or inductance between faces, communication between face sensors on the nodes, or by autonomous detectors that detect the presence of a face. In the latter case, an abutting face may be inferred to be a side of the container if its presence is detected, but no neighbor node is found in that location.

In an example, the material is poured into a cavity, pipe, interior shape, or other container, after which each grain securely (or non-securely if security is unnecessary) determines the unique ID and orientation of each neighboring grain, and the face they each neighboring grain abuts. Each grain thus knows its own location and orientation relative to each neighbor grain. In aggregate, polygon mapping can be used to then determine the overall geometry, volume, or other properties of the container holding the smart matter. In some cases, this may include polling each grain individually, or polling selected grains (such as edge grains), and then computing an overall geometry and volume of the container. In another example, the polls cooperatively perform a parallel computation of the geometry, using their own processing resources as a distributed computing platform. In some such embodiments, one node may be "elected" as a root or master node, which may coordinate the processing activities and communicate with external hosts. In other embodiments, one or more special root or master grains may be inserted. The root device may be a designated aggregation device that touches one or more grains, its function being to collate the system data. This grain may have a different form factor to accommodate additional computing resources.

Insertion of the master grain may itself trigger the computation. For example, the grains are poured into the container and allowed to settle. Once the grains settle, a master node is dropped into the mix. This master node then instructs the other nodes to perform the parallel computation, and reports the result to the external host. In other cases, the computation may simply be triggered by the external host requesting a result, triggering the nodes to start the computation and report the result. In yet another example, the nodes are pre-configured to report to the external host. In that case, the nodes are poured into the container, wait for perturbations to settle, and then autonomously start the calculation and report the result.

Grains can be many different shapes, such as spherical, oblong, tetrahedral, pyramidal, icosahedral, truncated icosahedral ("soccer ball" shape), or any other desired geometry, with any number of desired faces. In general, the selection of a shape and size for each grain may be an exercise in engineering judgment: Smaller grains with more faces may provide more accuracy in the measurement, but may be more expensive to manufacture, and more may be required. Larger grains with fewer faces may provide less accuracy, but may be less expensive to manufacture, and fewer may be required to fill a container. Note that in some cases, a heterogeneous mixture of grain types may be used. For example, to fill a large container, a courser grain may first be added to take up volume. Once the coarser grains have settled, finer grains may be added to fill in the voids. In a more general sense, there is no need for grains to be of homogeneous shape, size, or geometry.

In an example, each grain has a unique ID, and the ability to determine both the ID and orientation of any grains abutting any of its faces, such as via a short-range wireless communication medium. Each node may also be configured to provide similar information to its neighboring grains. Thus, each node has a localized picture of how it is oriented, who its neighbor nodes are, and how they are oriented. In one example where it is impractical (for example, because of manufacturing costs) to provide each node with its own orientation sensors, the nodes may only determine their orientations relative to one another based on abutting faces. With that information, absolute orientation may be inferred by designating at least one node with a known orientation (such as at the top or bottom of the container). The orientation of other nodes may then be based on that starting reference.

For full three-dimensional awareness, each grain may have at least four faces, though dividing the grain into even more faces may provide higher resolution. In some embodiments, grains with one, two, or three active faces may be used for measurements with appropriate constraints. For example, to measure a two-dimensional surface area, fewer active surfaces may be required.

Each grain may be configured to transmit the map of connected grains and its orientation to other touching grains. Some grains may be designated as "data forwarders", in which case they simply propagate their data. Other grains may be designated as "data aggregators" in which case they collate data from a number of nodes. In that case, data aggregators may have additional computing resources compared to data forwarders. As discussed above, a master node may also be designated to coordinate all the other grains. Thus, there may be several layers of grain hierarchy, with grains higher in the hierarchy having greater computing power to handle additional tasks. In one example, the master node is not a "grain" like the other nodes, but rather is an external host, such as a server, that is configured to work with and coordinate the grains. From a networking perspective, this host may be a "peer," but it may be a traditional PC or server, and may have the task of coordinating all of the grains, and optionally of performing the "number crunching" required to build a complete geometry of the container.

Each grain may include additional sensors to measure other useful environmental characteristics, such as density, wall thickness, image capture, or pollution, to name just a few nonlimiting example. In one embodiment, grains with unconnected sides (sides with no abutting nodes) may automatically capture such data and forward them for aggregation. Thus, the smart matter may capture not only the geometry of the object, but also its composition, density, purity, interior state, or other information.

Each grain may be provisioned with a unique identity (for example, an IPv6 address, or GUID). In an example, the unique ID is a private portion of a cryptographic key pair, which may be bound to a group key such as is provided in enhanced private ID (EPID). EPID is an enhancement to direct anonymous attestation (DAA). EPID provides for a common group public verification key that may be shared among many compute nodes. EPID enables devices to prove that they belong to a group without having to uniquely identify themselves. EPID also provides the ability to revoke a private key with a signature created by that key. Thus, certain embodiments may enable the use of secure pourable smart matter, which can prevent contamination or data loss. For example, in an industrial espionage attempt, an attacker may insert his own grain into a container, and use that grain to gain access to the information provided by the material, or he may send spurious signals to create a false geometry. But if nodes first authenticate other nodes (i.e., ensure that they belong to the group) before sharing position information, such an attack may be frustrated.

If a secure ID scheme is implemented, each nodes cryptographically secure identity can be used for:
 a. Secure attestation that the grain and its map data are members of the group
 b. Secure removal of all grains (for example, in medical, sterile, or purity-sensitive applications)
 c. Protecting the confidentiality and integrity of map information for the owner of the grains
 d. Increasing accuracy by assisting in the self-filtering of neighboring information that is determined to be invalid for any reason, e.g., a grain is malfunctioning or not part of the group Grains may have their own onboard, independent power source, which may optionally be rechargeable. In another embodiment, the grains are powered by an external source, such as an induced magnetic, electrical, or electromagnetic field. In one example, the application of the external power source or field may be the event that triggers the nodes to perform their computations.

In some cases, the nodes may perform continuous computations of their neighbors and orientations. In other embodiments, it may be preferable to permit the nodes to determine that substantial perturbations (such as from pouring) have ceased before performing any computations. This may include, for example, using accelerometers to determine that jostling and other motions have stopped. In any case, when nodes detect a change, such as a new neighbor is detected, or a neighbor is no longer detected, they may update their relative positions.

Once the computation is finished, the pourable smart matter may be removed and stored for later re-use if feasible to the application. In other embodiments, each node may be made of a material that is soluble, such as in water, acid, or a hydrocarbon, so that it naturally is consumed in the container. For example, in an well application, it may not be practical to extract the grains, so it may be better to make them soluble in the hydrocarbon being extracted, so that the hydrocarbon naturally consumes them.

Other embodiments and applications may include not only derivation of the internal geometry of a concave object, but also scanning its interior or exterior surface, or making measurements such as a wall thickness of matter, measuring degradation, or measuring pollution.

A system and method for providing a pourable smart matter will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1A is a perspective view of a portable smart matter 102 comprising a plurality of nodes 100. In this example, nodes 100 are of uniform shape and size. In some nonlimiting embodiments, nodes 100 may also be functionally uniform. Each node may have a number of active faces, each of which is configured to detect the identity of any node with an abutting face. Each node 100 may also have an orientation sensor with one, two, or three axes of sensitivity so that the node can detect its absolute orientation.

Although these nodes 100 are disclosed as uniform, that need not be the case. As described above, a hierarchy of nodes may be provided, with higher-level nodes having the same or a different geometry, and with higher-level nodes having potentially greater functionality. In such a hierarchy, one, two, three, or any other number of suitable levels of capability may be provided.

As seen in this example, nodes 100 may have a number of tessellating faces, with a higher number of faces being correlated to a higher precision of measurement.

Figure 1B:
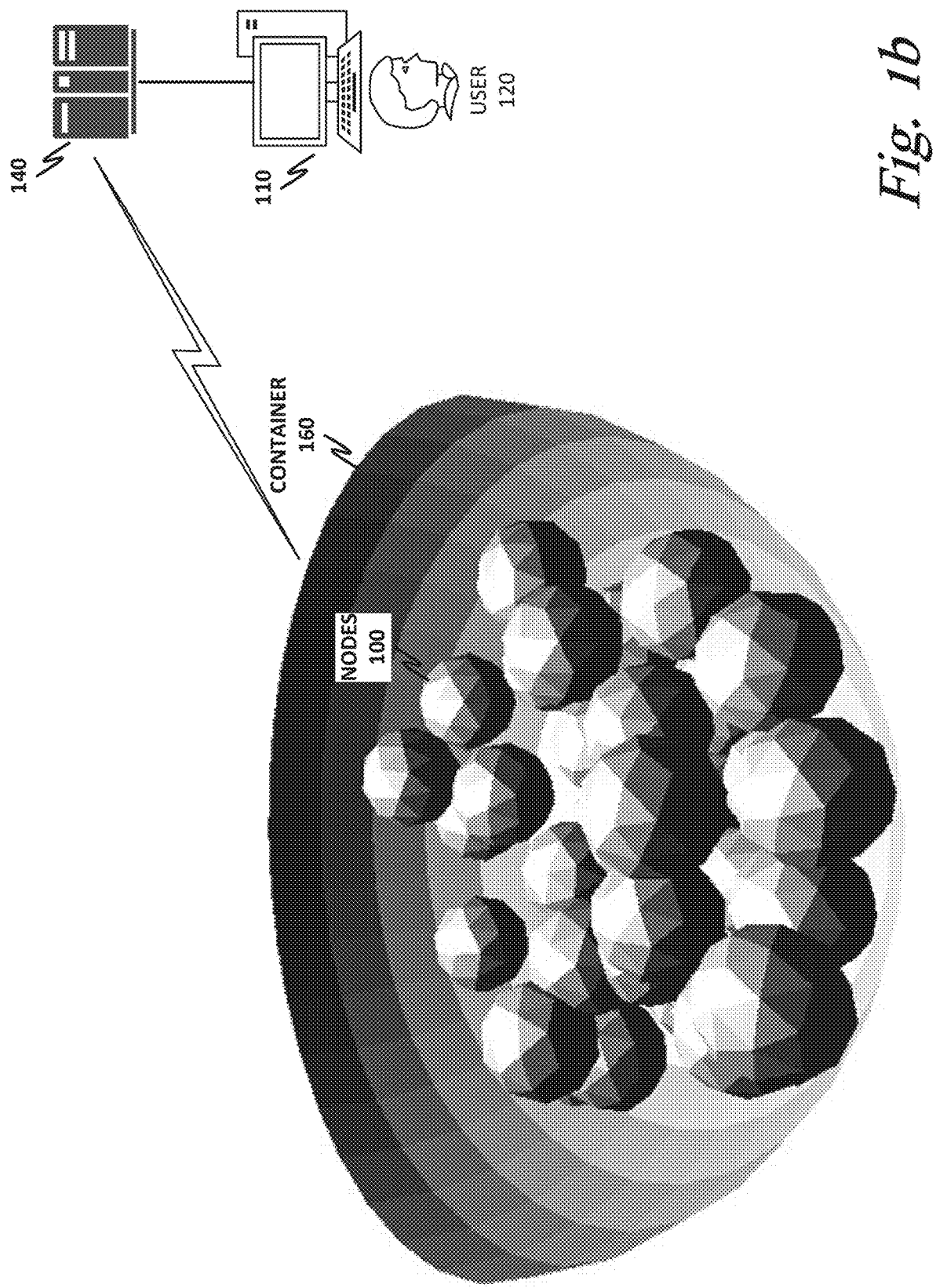
FIG. 1b is a perspective view of the pourable smart matter in a container.

FIG. 1B illustrates pourable smart matter 102 poured into a container 160 according to one or more examples of the present specification. A "container" 160 should be understood to include any type of surface, structure, or enclosure that may accommodate pourable smart matter 102, whether convex, concave, open, closed, or otherwise.

In this example, a cutaway perspective view of container 160 is provided to illustrate that nodes 100 substantially fill at least a portion of container 160, and thus give an indication of its geometry. Note that in some cases, as illustrated here, it is not necessary to measure the full geometry of container 160. Rather, it may be desirable to measure only a portion of container 160, in which case pourable smart matter 102 may be poured only into that portion. Also note that nodes 100 may not be to scale, either to each other or to container 160. Where greater precision is required, nodes 100 may be much smaller than they appear here, and may have more faces, though that need not be the case.

In this example, once again nodes 100 are of uniform shape and size. Nodes 100 may also be of uniform function, with each configured to detect any nodes 100 abutting any of its faces, and also optionally to detect when it abuts a surface that does not correspond to another node 100 (such as a side of container 160).

In this example, a user 120 operates a computer 110. In this case, computer 110 may be an engineering workstation that user 120 intends to use to view the geometry of container 160, and to otherwise apply useful information to the geometry. Depending on the embodiment, computer 110 may be considered a hierarchical node 100 of pourable smart matter 102, or an external host that is interfacing to pourable smart matter 100.

Note that nodes 100 are shown "dry" in this embodiment, but in some cases, nodes 100 could be colloidally suspended in a medium, such as a non-conductive hydrocarbon, silicone liquid, or other suitable medium. In this and in other cases, abutting nodes may not touch each other, but may be proximate to one another.

A server 140 is also shown, which in one embodiment may be a master node to a hierarchical pourable smart matter 102. For example, server 140 may wirelessly collect data from each individual node, or from a selection of nodes 100, and may then use its processing power to compile and aggregate a geometry of container 160, such as by using a vector graphic algorithm or other suitable geometric algorithm. In another example, server 140 instructs nodes 100 to begin a parallel computation, in which case nodes 100 work in parallel to compute an overall geometry of container 160. In that case, each node 100 need not be limited to computing its own local geometry. Rather, the full table of relative position profiles may be collected first, and then each node may simply serve as a regular compute node in a massively parallel computation. Once server 140 has computed the geometry, it may report this information to workstation 110 operated by user 120.

In some examples, server 140 may not be necessary. Rather, as discussed above, a master node that is itself of the same or a similar form factor to nodes 100 may be deposited within container 160, and this node may control the parallel computation, and report results to workstation 110. In another embodiment, the master node is simply added with the rest of the nodes, and computation begins when perturbations have ceased. In yet another example, nodes 100 are powered externally, such as by an applied field (similar to how RFID chips are activated). When the field is applied, the master node may begin its computations, or the nodes may elect a master node and begin their computations. It will be apparent to those with skill that many other configurations, including many different options for triggering the computation or providing a master node, are possible.

Figure 1C:
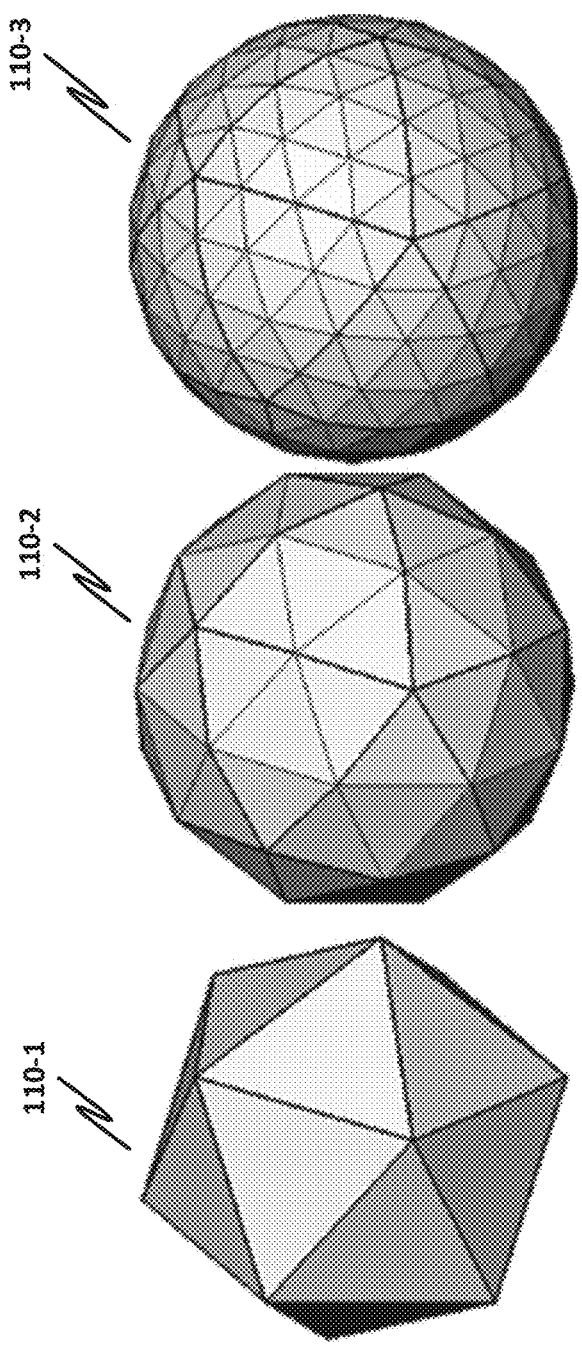
FIG. 1c is a perspective view of compute nodes having various mechanical shapes.

FIG. 1C is a perspective view of three heterogeneous nodes 100-1, 100-2, and 100-3. As can be seen in this embodiment, nodes 100-1, 100-2, and 100-3 each have a different and unique geometry. These nodes may be provided in three different pourable smart matters 102, or all provided, each in any number, in the same pourable smart matter 102. It should also be noted that although these nodes are shown with substantially the same radius, the sizes may in fact vary greatly.

In this example, there are shown grains with 12 faces (100-1), 24 faces (100-2), and 48 faces (100-3). Note that in one example, each face is an "active" face with a sensor point. In other embodiments, only some selected faces are active, while other faces provide mechanical advantages but are otherwise passive.

Note also that while these embodiments are shown with facets, the grain does not need to be faceted. Sensor points (and thus "active faces") can be mapped onto any solid, such as a sphere, or oblong spheroid (similar to the form factor of many common RFID chips), as long as contact areas between grains are discretely identifiable.

If all three of these heterogeneous grains are provided in the same pourable smart matter 102, a face of node 100-1 may, for example, abut the face of node 100-2. Although nodes 100-1 and 100-2 have different geometries and different face sizes, they may nevertheless be configured to detect each other's faces. Again, despite the heterogeneous nature of the form factor of three nodes, the function of each node may be identical, or alternately, each form factor could correspond to a different function in a node hierarchy. This could be used to make the different types of nodes easily distinguishable from one another (e.g., 100-1 is a master node, 100-2 is an aggregating node, and 100-3 is a forwarding node).

Figure 2:
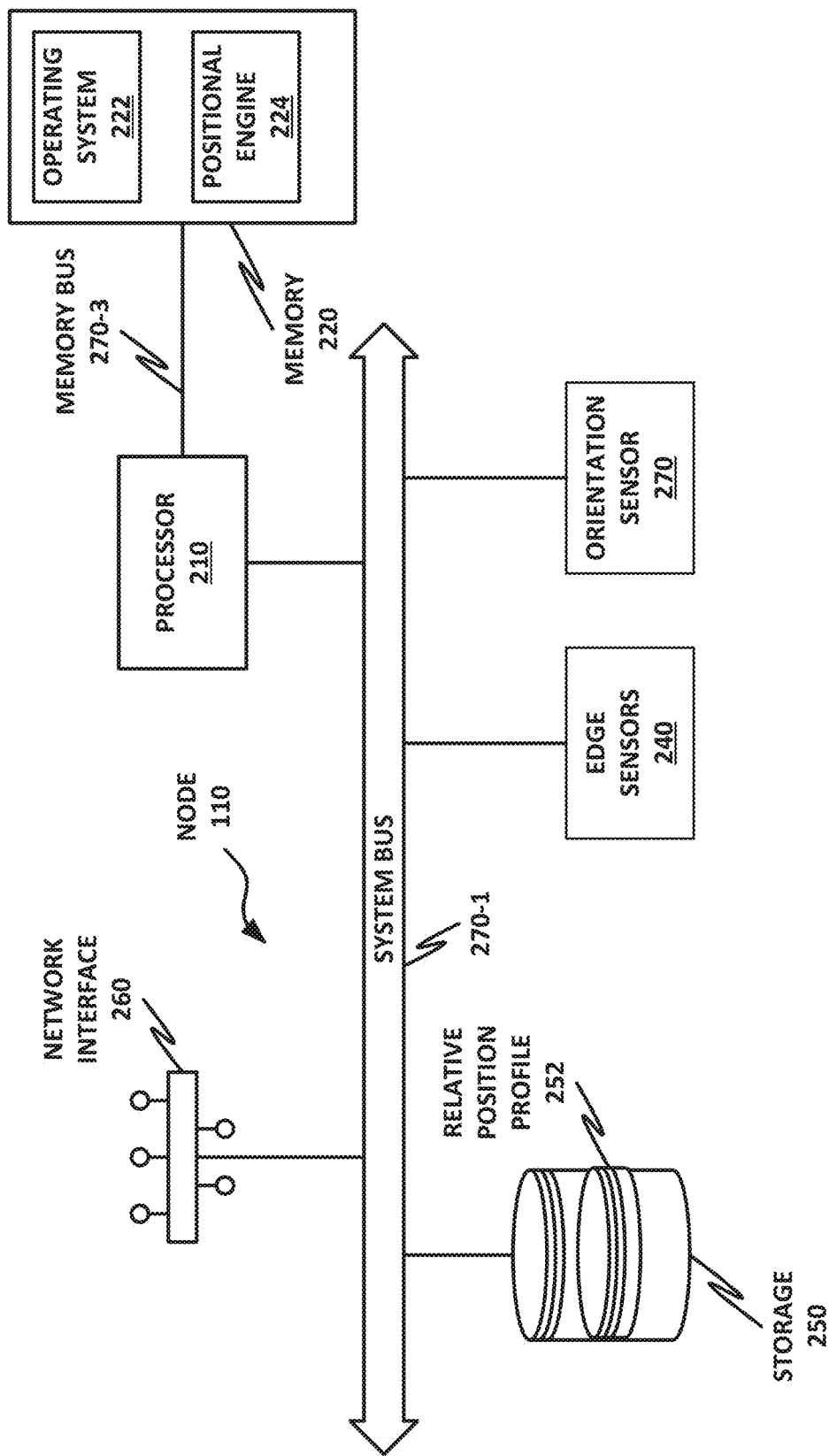
FIG. 2 is a block diagram of a compute node according to one or more examples of the present specification.

FIG. 2 is a block diagram of compute node 100 according to one or more examples of the present specification. Compute node 100 may be any suitable computing device. In various embodiments, a "computing device" may be or comprise, by way of non-limiting example, a grain of pourable smart matter, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host." Note that this is true even though this specification relates to a pourable smart matter, because pourable smart matter 102 may be heterogeneous as described above, including grains poured into container 160, as well as other devices such as server 140 or workstation 110.

Compute node 100 includes a processor 210 connected to a memory 220, having stored therein executable instructions for providing an operating system 222 and at least software portions of a positional engine 224. Other components of compute node 100 include a storage 250, network interface 260. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation. Thus, even in the same embodiment, some compute nodes 100 may be provided as a single application-specific integrated circuit (ASIC) or system-on-a-chip (SoC), while other compute nodes 100 may be provided as traditional computers with pluggable interfaces, peripherals, and input/output devices.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of positional engine 224. Note that operating system 222 is optional, particularly for compute nodes that are grains, which may be more conveniently programmed on "bare metal" for low overhead, or which may include a minimal operating system 222. Many other configurations are also possible, and are intended to be encompassed within the broad scope of this specification.

In an example, storage 250 has stored therein, or is capable of storing, a relative position profile 252. Relative positional profile 252 may include an identity of node 100, and a catalog of each of its abutting faces, along with which face of which node they abut. Building positional profile 252 may include operating edge sensors 240 and orientation sensors 270. Edge sensors 240 may include any of the types of sensor discussed above, and may be configured to identify the proximity of (and optionally, the distance to) abutting faces, as well as the identity of the abutting faces. Orientation sensor 270 may include any of the sensor types mentioned above, and may be configured to detect the orientation of node 100 overall, or of a particular face, along one, two, or three axes.

Network interface 260 may be provided to communicatively couple compute node 100 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or Bluetooth, Radio Frequency (RF), any local area network (LAN), metropolitan area network (MAN), wide area network (WAN), wireless local area network (WLAN), virtual private network (VPN), intranet, or any other appropriate architecture or system that facilitates communications in a network or telephonic environment.

Positional engine 224, in one example, is operable to carry out computer-implemented methods as described in this specification. Positional engine 224 may include one or more tangible non-transitory computer-readable mediums having stored thereon executable instructions operable to instruct a processor to provide a positional engine 224. As used throughout this specification, an "engine" includes any combination of one or more logic elements, of similar or dissimilar species, operable for and configured to perform one or more methods provided by the engine. Thus, positional engine 224 may comprise one or more logic elements configured to provide methods as disclosed in this specification. In some cases, positional engine 224 may include a special integrated circuit designed to carry out a method or a part thereof, and may also include software instructions operable to instruct a processor to perform the method. In some cases, positional engine 224 may run as a "daemon" process. A "daemon" may include any program or series of executable instructions, whether implemented in hardware, software, firmware, or any combination thereof that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that positional engine 224 may also include other hardware and software, including configuration files, registry entries, and interactive or user-mode software by way of non-limiting example.

In one example, positional engine 224 includes executable instructions stored on a non-transitory medium operable to perform a method according to this specification. At an appropriate time, for example upon booting compute node 100, upon application of an external power field, upon settling out of perturbations, or upon a command from operating system 222 or a user 120, processor 210 may retrieve a copy of the instructions from storage 250 and load it into memory 220. Processor 210 may then iteratively execute the instructions of positional engine 224 to provide the desired method.

Figure 7:
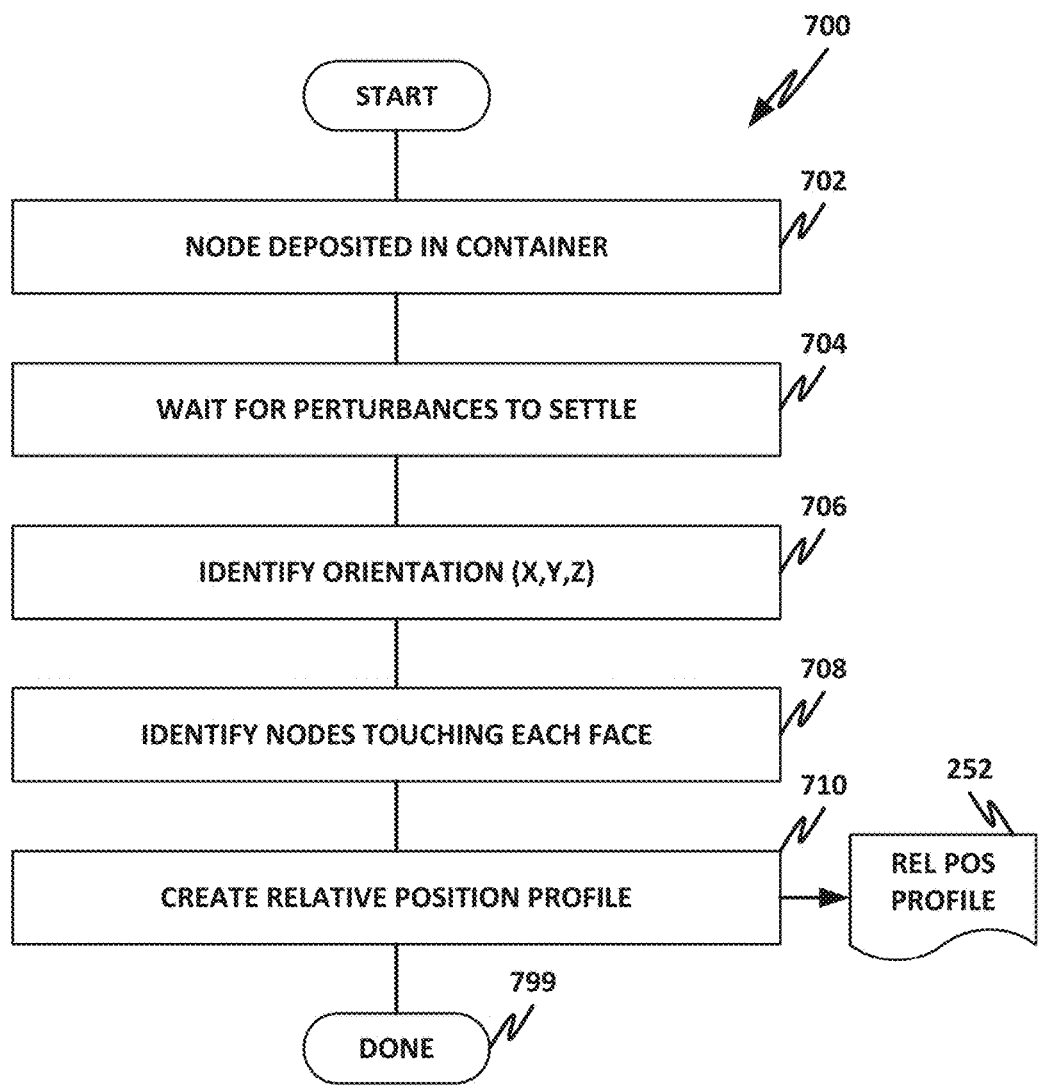
FIG. 7 is a flow chart of a method according to one or more examples of the present specification.
Figure 9:
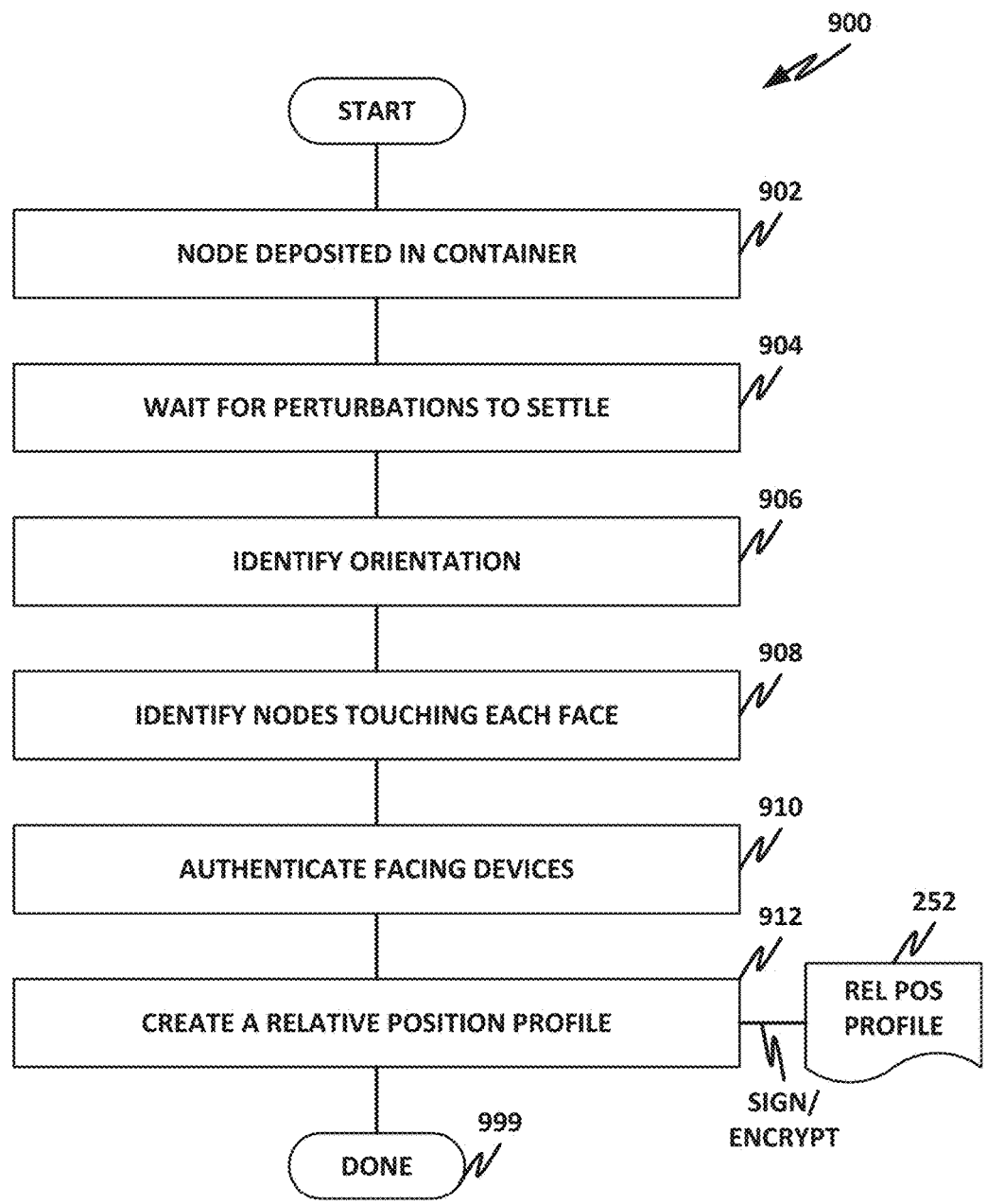
FIG. 9 is a flow chart of a method according to one or more examples of the present specification.

Positional engine 224 may be configured to perform methods of this specification, such as method 700 of FIG. 7, or method 900 of FIG. 9, by way of nonlimiting example. In a general sense, these methods may include identifying an appropriate time to begin measurements. Upon starting to measure, positional engine 224 may use orientation sensors 270 to determine its orientation, such as on one, two, or three axes. Positional engine 224 may also operate edge sensors 240 to identify which faces are abutting a neighbor node. In one example, when a node 100 determines that a face f abuts a face of a neighboring node, node 100 engages in a two-way communication with the neighboring node, in which each identifies to the other the identity of the abutting face. In another example, the face itself has some minimal logic to uniquely identify itself. For example, if node n has a unique ID 0x1234, and has 16 faces, numbered $f_0$-$f_{15}$ (or alternately, $f_{0x0}$-$f_{0xF}$), face 3 may be uniquely identified as $n_{0x1234}f_3$. If this face abuts face 7 of node 0x1235, then node 0x1235 may use positional engine 224 to store in its data structure that its face 7 abuts face $n_{0x1234}f_3$. Furthermore, using orientation sensor 270, the node may also construct a vector of one, two, or three dimensions to indicate the direction that its face 7 is facing, and may also attach this value to the data structure. Node 0x1235 may then loop through all of its faces and determine for each if it abuts another face, and what direction it faces. In some embodiment, node 0x1235 may also request from node 0x1234 (such as via network interface 260) and from other abutting nodes additional information, such as their orientations and abutting faces. Upon building its relative positional profile 252, positional engine 224 may then wait until it receives a further request, such as to report its position, or to participate in a parallel computation.

Figure 3:
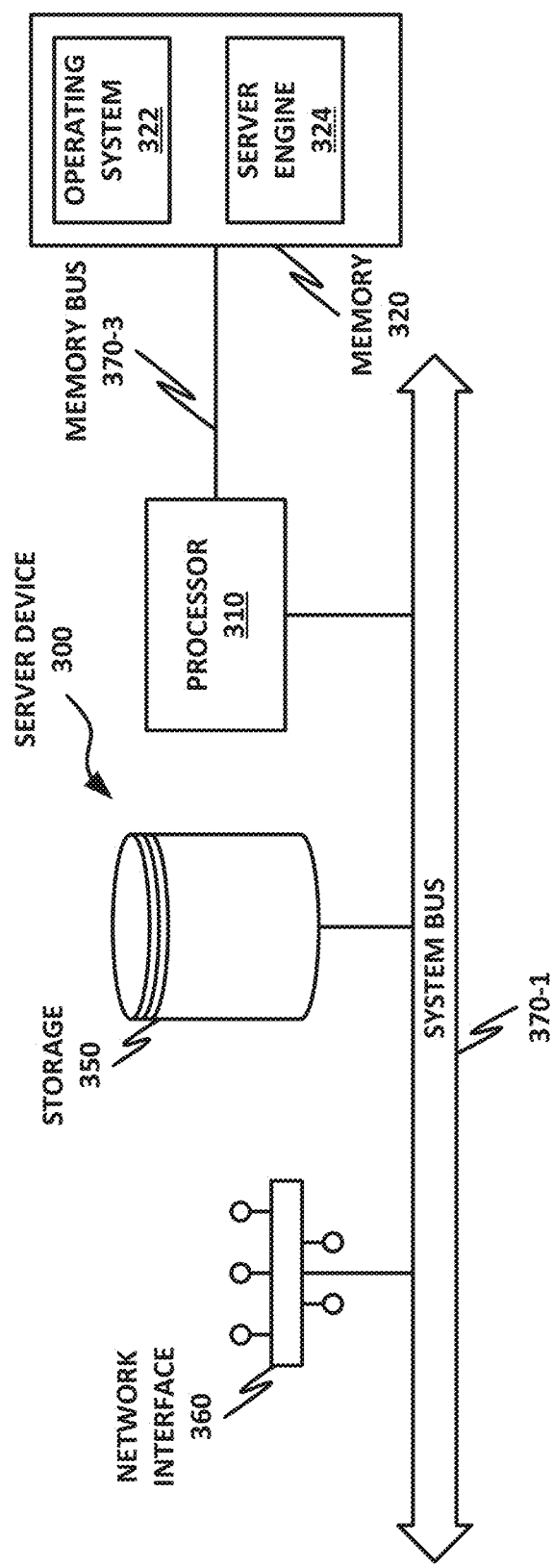
FIG. 3 is a block diagram of a server according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein compute nodes 100 provide certain localized tasks, while server 300 provides certain other centralized tasks.

Server 300 includes a processor 310 connected to a memory 320, having stored therein executable instructions for providing an operating system 322 and at least software portions of a server engine 324. Other components of server 300 include a storage 350, and network interface 360. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server engine 324.

Network interface 360 may be provided to communicatively couple server 140 to a wired or wireless network, and may include one or more logic elements as described in FIG. 2.

Server engine 324 is an engine as described in FIG. 2 and, in one example, includes one or more logic elements operable to carry out computer-implemented methods as described in this specification. Software portions of server engine 324 may run as a daemon process.

Server engine 324 may include one or more non-transitory computer-readable mediums having stored thereon executable instructions operable to instruct a processor to provide a security engine. At an appropriate time, such as upon booting server 140 or upon a command from operating system 322 or a user 120 or security administrator 150, processor 310 may retrieve a copy of server engine 324 (or software portions thereof) from storage 350 and load it into memory 320. Processor 310 may then iteratively execute the instructions of server engine 324 to provide the desired method.

Figure 8:
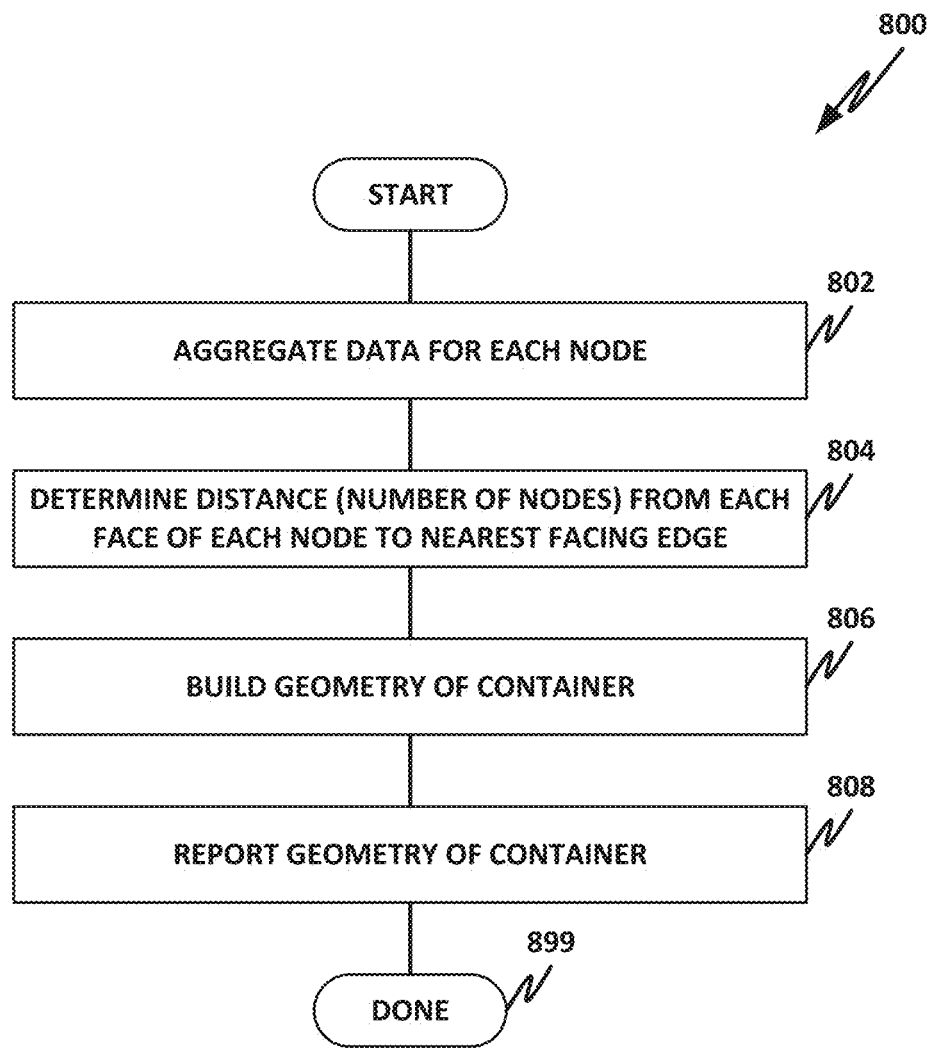
FIG. 8 is a flow chart of a method according to one or more examples of the present specification.
Figure 10:
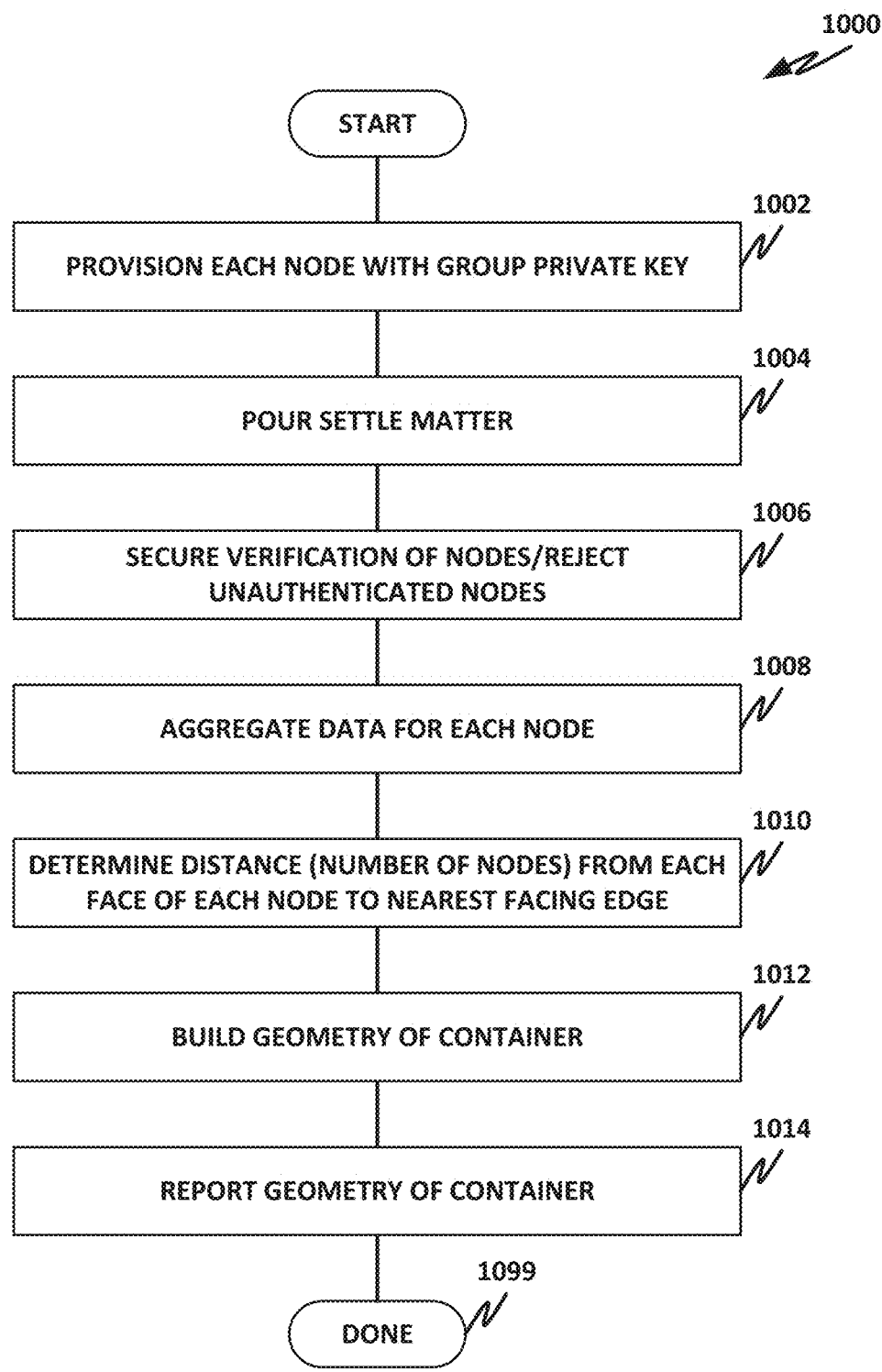
FIG. 10 is a flow chart of a method according to one or more examples of the present specification.

Server engine 324 may provide certain centralized tasks, such as by way of nonlimiting example methods 800 of FIG. 8 or 1000 of FIG. 10. This may enable server 300 to act as a "master" or "root" node in the architecture. Thus, it should be understood that like node 100, server 300 may be either a standalone device, or a grain of pourable smart matter 102.

Figure 4:
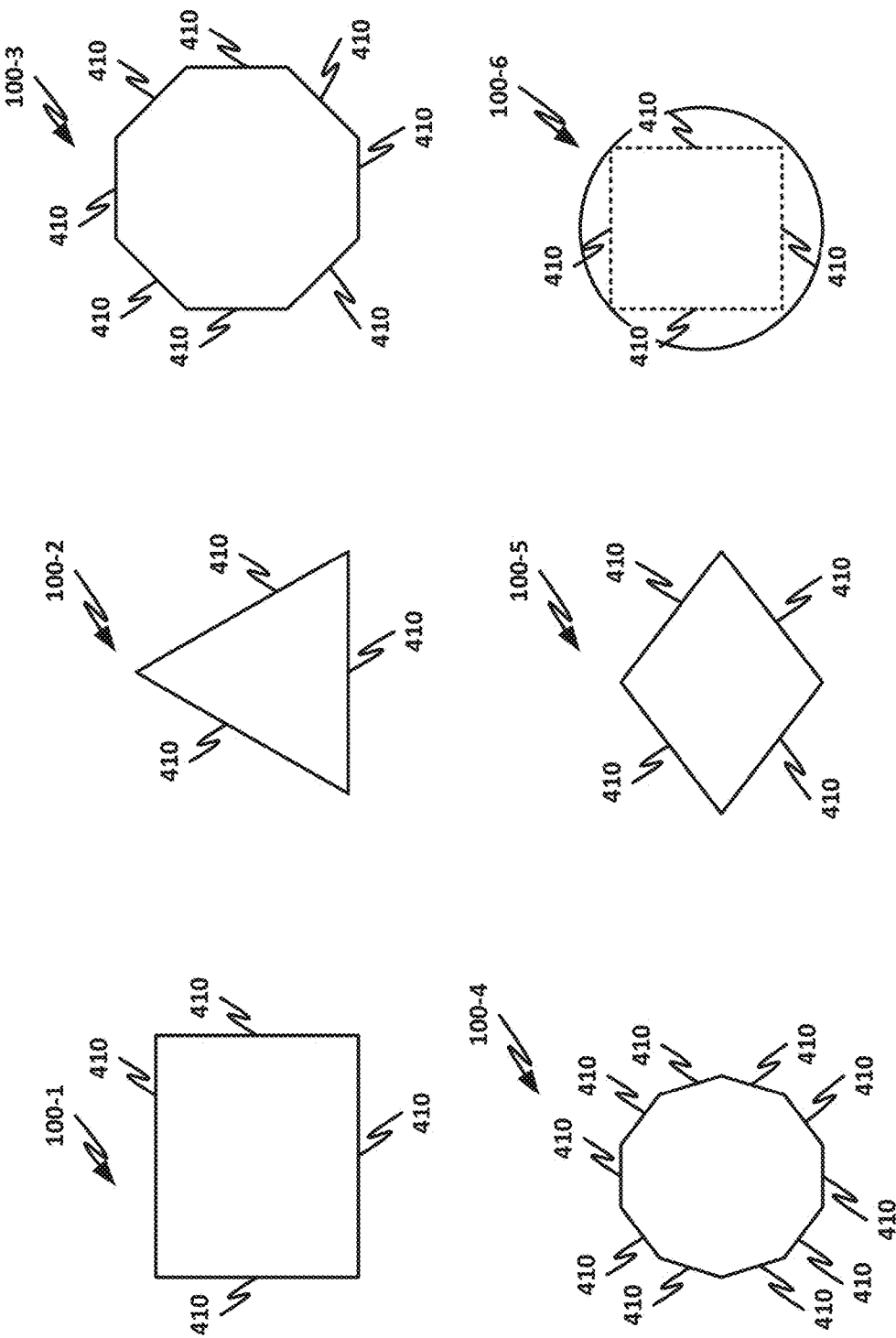
FIG. 4 is a series of cutaway side views of compute nodes according to one or more examples of the present specification.

FIG. 4 is a series of cutaway side views of nodes 100 according to one or more examples of the present specification. FIG. 4 illustrates just six of the infinite possibility of shapes, sizes, and form factors that may be provided for compute nodes 100. Specifically, node 100-1 has four sides in profile. Node 100-2 has three sides in profile. Node 100-3 has eight sides in profile. Node 100-4 has ten sides in profile. Node 100-5 has four sides in profile. Node 100-6 is spherical. As illustrated in this example, each node 100 has a plurality of faces 410. For example, node 100-1 has a minimum of 4 faces 410. Note however that because this is a cutaway side view, two additional faces 410 may also be provided, so that in total node 110-1 may have six faces. The other nodes are similar in that they may have more faces (in some cases, many more faces) than are visible in this cutaway side view.

Node 100-6 is slightly different from the other nodes, in that it is a sphere and so it has no flat surfaces. However, discrete faces 410 may nevertheless be defined or provided on the surface of sphere 100-6. In this case, a cube with 6 faces is shown in profile, so that sphere 100-6 has six discrete faces that can sense proximity to faces of other grains. In other embodiments, other designs may be used with more or fewer faces. Note that a sphere is a nonlimiting example as well. For example, many RFID devices are oblong spheroids, and such a shape could also be adapted as a grain of pourable smart matter.

In these examples, each node 100 is shown with all of its faces being active faces. However, in some examples where less precision is needed for the application, only some selected faces may be active. For example, in node 100-4, only one half of the faces may be active faces. Other faces may be flat faces that can tessellate to other nodes, but these nodes will not be detected as active faces. This will provide an overall lower resolution picture, but in some embodiments, the trade-off in cost and design complexity may be acceptable. Thus, the present example where each node is shown with all of its faces being active should be understood to be a nonlimiting example.

Figure 5:
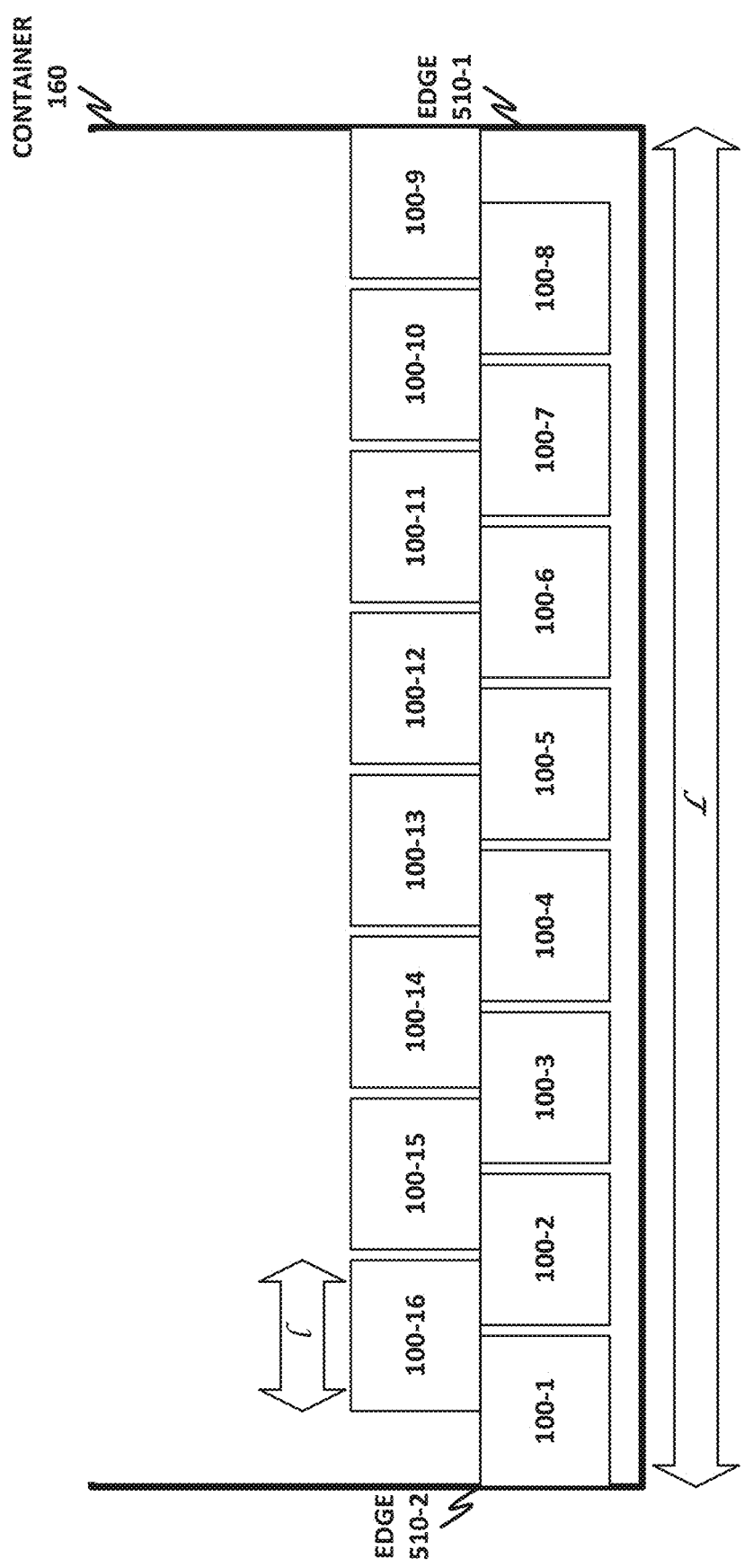
FIG. 5 is a cutaway side view of smart matter in a container according to one or more examples of the present specification.

FIG. 5 is a cutaway side view of a container 160 filled with a pourable smart matter 102 according to one or more examples of the present specification. In this case, for the sake of simplicity, container 160 is shown as having a rectangular profile, and nodes 100 are shown as also having rectangular profiles. This should be understood, however, to be a nonlimiting example.

In this case, each node has a length l. The nodes may be used in this case to measure the overall length L of container 160, between edge 510-1 and edge 510-2.

On the bottom layer, nodes 100-1 through 100-8 fill container 160 almost to edge 510-1. However, a small amount of space is left over at the side of node 100-8. Nodes 100-9 through 100-16 sit above nodes 100-1 through 100-8. In this case, node 100-9 touches the right edge 510-1 of container 160. Node 100-16 does not quite touch the left edge 510-2 of container 160. Thus, based solely on information from the bottom row, smart matter 102 can compute that the length L of container 160 is greater than 8l, and less than 9l. In some embodiments, this may be acceptable. If length L needs to be measured with greater precision, then the length l of nodes 100 may be shortened, so that a more accurate measurement can be obtained.

In one example, a higher resolution geometry may be inferred by also noting that nodes 100-9 through 100-16 touch the right edges and not the left edge, while nodes 100-1 through 100-8 touch the left edge but not the right edge. If nodes 100 are provided with edge sensors 240 that can measure distance, then node 100-8 may measure the gap from itself to edge 510-1. Node 100-16 may also measure the gap from itself to edge 510-2. Note that if container 160 were filled with nodes to its top, it's height could also be determined, while its width could be determined by filling the full bottom face. For simplicity of the illustration, the width of container 160 is not shown.

Figure 6:
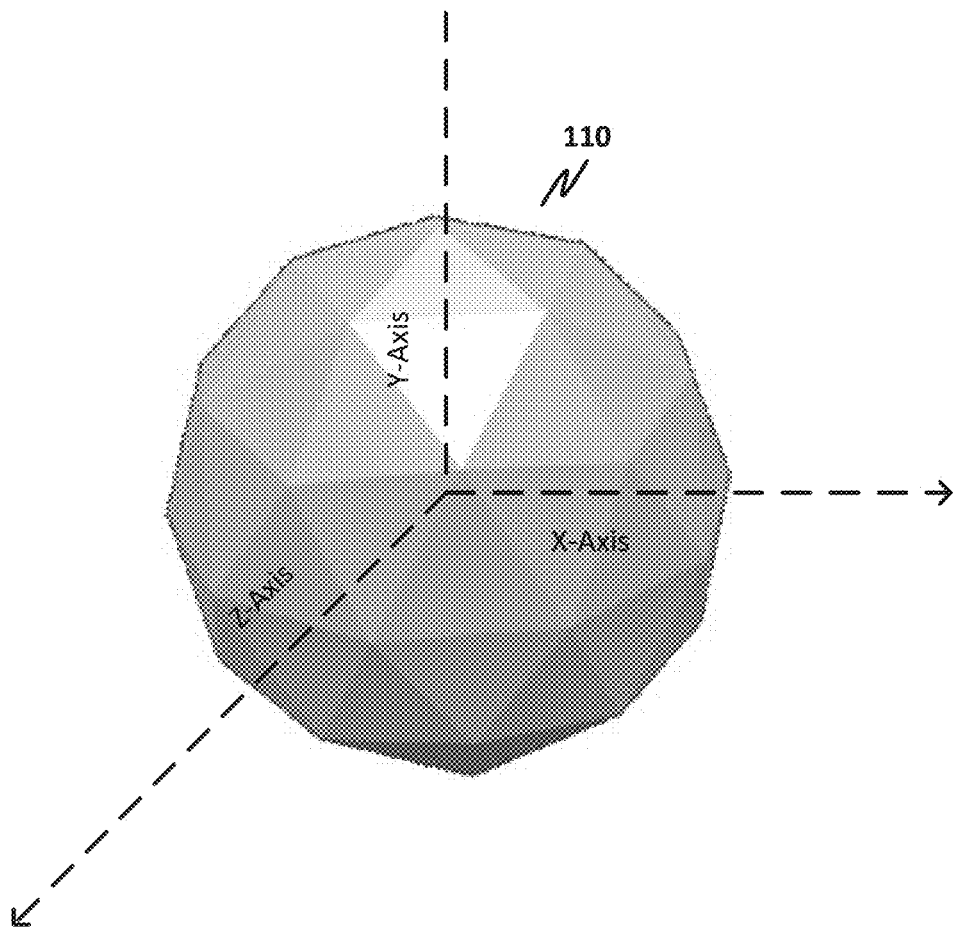
FIG. 6 is a perspective view of a three-dimensional orientation of a compute node according to one or more examples of the present specification.

FIG. 6 is a perspective view of a node 100 illustrating the node against a three-dimensional XYZ axis. The XYZ axis is shown to illustrate that node 100 may include orientation sensors 270, such as gyroscopes or accelerometers, that may be sensitive on one, two, or three axes, and that enable node 100 to determine its spatial orientation.

FIG. 7 is a flowchart of a method 700 that may be performed by nodes 100 forming grains of a pourable smart matter 102 according to one or more examples of the present specification.

In block 702, node 100 is deposited in a container, such as by pouring. Reference is made herein to FIG. 1B to illustrate how this may be accomplished in one nonlimiting example.

In block 704, node 100 waits for perturbations to settle out. These perturbations may be caused by the act of pouring pourable smart matter 102 into the container 160. Note however, that this is provided by way of nonlimiting example only. In other cases, node 100 performs its computations continuously, or when triggered by a factor such as the settling out of perturbations, application of an external power field, or detecting the presence of a master node, as discussed in more detail above.

In block 706, node 100 determines its orientation, such as XYZ orientation. This may be, for example, a three-dimensional vector. Reference is made to FIG. 6 as an illustration of axes to which node 100 may be sensitive.

In block 708, node 100 detects that some number of other nodes 100 have abutting faces 410. Node 100 may operate edge sensors 240 to determine the identity of each abutting face of each neighbor node. Note that as described above, edge sensors 240 may be autonomous in this function, or they may communicate via network interface 260.

In block 710, node 100 records a relative position profile 252. Relative position profile 252 is described in more detail in, inter alia, paragraph [0056] above.

After node 100 has stored its relative position profile 252, in block 799, the method is done.

FIG. 8 is a flowchart of a method 800 performed by a master node, such as server 140, or a master grain, according to one or more examples of the present specification.

In block 802, the master node aggregates data for each node in the matter. This may include polling each node and receiving a response comprising that node's relative position profile 252. The full array of relative position profiles $252_1 \ldots 252_n$ may be stored in a data structure of the master node.

In block 804, the master node computes the distance and direction from each face of each node to the facing edge of container 160. Note that this computation may be performed for all of the nodes, or only for some selected nodes. The selection may depend on the specific embodiment.

In block 806, after computing the distance and direction from each face to an edge of container 160, the master node is able to build a geometry of container 160. This may involve a vector graphics computation, ray tracing, bit mapping, or any other suitable geometric computation. Note that this computation may be performed wholly on the master node, or may be distributed among many nodes 100. Where appropriate, compression may also be used.

In block 808, the master node reports the geometry of the container to an external host, such as workstation 110.

In block 899, the method is done.

FIG. 9 is a flowchart of a method 900 that may be performed by nodes 100 forming grains of a pourable smart matter 102 according to one or more examples of the present specification.

In block 902, node 100 is deposited in a container, such as by pouring. Reference is made herein to FIG. 1B to illustrate how this may be accomplished in one nonlimiting example.

In block 904, node 100 waits for perturbations to settle out. These perturbations may be caused by the act of pouring pourable smart matter 102 into the container 160. Note however, that this is provided by way of nonlimiting example only. In other cases, node 100 performs its computations continuously, or when triggered by a factor such as the settling out of perturbations, application of an external power field, or detecting the presence of a master node, as discussed in more detail above.

In block 906, node 100 determines its orientation, such as XYZ orientation. This may be, for example, a three-dimensional vector. Reference is made to FIG. 6 as an illustration of axes to which node 100 may be sensitive.

In block 908, node 100 detects that some number of other nodes 100 have abutting faces 410. Node 100 may operate edge sensors 240 to determine the identity of each abutting face of each neighbor node. Note that as described above, edge sensors 240 may be autonomous in this function, or they may communicate via network interface 260.

In block 910, before accepting inputs from other nodes 100, node 100 first authenticates those nodes. This may take the form, for example, of DAA, EPID, or some other key exchange or attestation method. For any nodes that do not authenticate correctly, node 100 may reject those data and not engage in any further communication with those nodes. Node 100 may also report the failure of authentication, which could for example indicate an attempted attack, or a faulty node.

In block 912, node 100 records a relative position profile 252. Relative position profile 252 is described in more detail in, inter alia, paragraph [0056] above. In this case, relative position profile 252 may be cryptographically signed and/or encrypted to ensure that it can be accessed only by other nodes holding the proper keys, such as a shared key for pourable smart matter 102.

After node 100 has stored its relative position profile 252, in block 999, the method is done.

FIG. 10 is a flowchart of a method 1000 performed by a master node, such as server 140, or a master grain, according to one or more examples of the present specification.

In block 1002, the master node (such as server 140) provisions each grain (node 100) of pourable smart matter 102 with a group private key.

In block 1004, pourable smart matter 102 is poured into container 160 and permitted to settle.

In block 1006, before accepting inputs from nodes 100, the master node authenticates the nodes, and rejects any input from unauthenticated nodes. This may take the form, for example, of DAA, EPID, or some other key exchange or attestation method. For any nodes that do not authenticate correctly, node 100 may reject those data and not engage in any further communication with those nodes. The master node may also log the failed authentication, which could for example indicate an attempted attack, or a faulty node.

In block 1008, the master node aggregates data for each authenticated node in the matter. This may include polling each node and receiving a response comprising that node's relative position profile 252. The full array of relative position profiles $252_1 \ldots 252_n$ may be stored in a data structure of the master node.

In block 1010, the master node computes the distance and direction from each face of each node to the facing edge of container 160. Note that this computation may be performed for all of the nodes, or only for some selected nodes. The selection may depend on the specific embodiment.

In block 1012, after computing the distance and direction from each face to an edge of container 160, the master node is able to build a geometry of container 160. This may involve a vector graphics computation, ray tracing, bit mapping, or any other suitable geometric computation. Note that this computation may be performed wholly on the master node, or may be distributed among many nodes 100. Where appropriate, compression may also be used.

In block 1014, the master node reports the geometry of the container to an external host, such as workstation 110.

In block 1099, the method is done.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, compute nodes 100 or server devices 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 210, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220 and storage 250, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 210 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

There is disclosed in one example, an apparatus, comprising: a mechanical structure having a plurality of faces, the faces having abutting face detectors; a network interface; and one or more logic elements comprising a positional engine to: identify a neighbor apparatus abutting at least one of the faces; and build an individual positional profile based at least in part on the identifying.

There is further disclosed an example, further comprising an orientation sensor, and wherein the positional engine is to build the individual positional profile based at least in part on an input from the orientation sensor.

There is further disclosed an example, wherein the orientation sensor is sensitive to at least two axes.

There is further disclosed an example, wherein the orientation sensor is sensitive to at least three axes.

There is further disclosed an example, wherein the orientation sensor is to determine at least an upward orientation.

There is further disclosed an example, wherein identifying a neighbor apparatus comprising verifying that the neighbor apparatus has a valid encryption key.

There is further disclosed an example, wherein the positional engine is further to communicate the positional profile via the network interface.

There is further disclosed an example, wherein communicating the positional profile comprises verifying a security token.

The apparatus of claim 1, wherein the mechanical structure is a tessalatable solid.

There is further disclosed an example, wherein the positional engine is further to determine a distance to a facing edge of a container holding the apparatus.

There is further disclosed an example, wherein determining the distance comprises determining a number of similar apparatuses disposed between the apparatus and the facing edge.

There is further disclosed an example, wherein the positional engine is further to participate as a compute node in a parallel computation of a geometry of the container.

There is further disclosed an example, wherein the geometry is a three-dimensional geometry.

There is further disclosed an example, wherein the geometry is a two-dimensional geometry.

There is further disclosed an example, wherein the positional engine is further to participate in a parallel computation of a volume of the container.

There is further disclosed an example of a pourable smart matter comprising a plurality of the apparatuses, wherein the apparatuses comprise a plurality of compute nodes.

There is further disclosed an example, wherein the compute nodes are peers.

There is further disclosed an example, wherein at least one of the compute nodes is designated as a master node.

There is further disclosed an example, wherein the master node is to collect a full geometry of a container holding the pourable smart matter.

There is further disclosed an example, wherein the master node collects a geometry of any node touching the master node.

There is further disclosed in an example, a pourable smart matter comprising: a plurality of compute nodes, the compute nodes comprising: a mechanical structure having a plurality of faces, the faces having abutting face detectors; a network interface; and one or more logic elements comprising a positional engine to: identify a neighbor compute node abutting at least one of the faces; and build an individual positional profile based at least in part on the identifying.

There is further disclosed an example, wherein the compute nodes are peers.

There is further disclosed an example, wherein at least one of the compute nodes is designated as a master node.

There is further disclosed an example, wherein the master node is to collect a full geometry of a container holding the pourable smart matter.

There is further disclosed an example, wherein the master node collects a geometry of any node touching the master node.

There is further disclosed an example, wherein the compute nodes are substantially uniform.

There is further disclosed an example of one or more tangible, non-transitory computer-readable mediums having stored thereon executable instructions for instructing a processor to provide a positional engine to: identify a neighbor compute node abutting at least one face of a host compute node for the positional engine; and build an individual positional profile for the host compute node based at least in part on the identifying.

There is further disclosed an example, wherein the positional engine is to build the individual positional profile based at least in part on an input from an orientation sensor of the host compute node.

There is further disclosed an example, wherein the orientation sensor is sensitive to at least two axes.

There is further disclosed an example, wherein the orientation sensor is sensitive to at least three axes.

There is further disclosed an example, wherein the orientation sensor is to determine at least an upward orientation.

There is further disclosed an example, wherein identifying a neighbor compute node comprises verifying that the neighbor apparatus has a valid encryption key.

There is further disclosed an example, wherein the positional engine is further to communicate the positional profile via the network interface.

There is further disclosed an example, wherein communicating the positional profile comprises verifying a security token.

There is further disclosed an example, wherein the positional engine is further to determine a distance to a facing edge of a container holding the apparatus.

There is further disclosed an example, wherein determining the distance comprises determining a number of similar compute nodes disposed between the apparatus and the facing edge.

There is further disclosed an example, wherein the positional engine is further to participate in a parallel computation of a geometry of the container.

There is further disclosed an example, wherein the geometry is a three-dimensional geometry.

There is further disclosed an example, wherein the geometry is a two-dimensional geometry.

There is further disclosed an example, wherein the positional engine is further to participate in a parallel computation of a volume of the container.

There is further disclosed in an example, a method of measuring a container, comprising: filling the container with a pourable smart matter comprising a plurality of compute nodes, a plurality of compute nodes, the compute nodes comprising: a mechanical structure having a plurality of faces, the faces having abutting face detectors; a network interface; and one or more logic elements comprising a positional engine to: identify a neighbor compute node abutting at least one of the faces; and build an individual positional profile based at least in part on the identifying.

There is further disclosed an example, wherein the compute nodes are peers.

There is further disclosed an example, wherein at least one of the compute nodes is designated as a master node.

There is further disclosed an example, wherein the master node is to collect a full geometry of a container holding the pourable smart matter.

There is further disclosed an example, wherein the master node collects a geometry of any node touching the master node.

There is further disclosed an example, further comprising querying at least one compute node for a geometry of the container.

There is further disclosed an example, further comprising querying at least one compute node for a volume of the container.

There is further disclosed an example of one or more tangible, non-transitory computer-readable storage mediums having stored thereon executable instructions for instructing one or more processors for providing a positional engine operable for performing any or all of the operations of the preceding examples.

There is further disclosed an example of a method of providing a positional engine comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. An apparatus, comprising:
    a mechanical structure having a plurality of faces, the faces having abutting face detectors;
    a network interface; and
    a processor circuit; and
    instructions encoded within the processor circuit to:
        identify a neighbor apparatus abutting at least one of the faces;
        build an individual positional profile based at least in part on the identifying; and
        determine a distance to a facing edge of a container holding the apparatus, comprising determining a number of similar apparatuses disposed between the apparatus and the facing edge.

2. The apparatus of claim 1, further comprising an orientation sensor, and wherein the processor circuit is to build the individual positional profile based at least in part on an input from the orientation sensor.

3. The apparatus of claim 2, wherein the orientation sensor is sensitive to at least two axes.

4. The apparatus of claim 2, wherein the orientation sensor is sensitive to at least three axes.

5. The apparatus of claim 2, wherein the orientation sensor is to determine at least an upward orientation.

6. The apparatus of claim 1, wherein identifying a neighbor apparatus comprising verifying that the neighbor apparatus has a valid encryption key.

7. The apparatus of claim 1, wherein the processor circuit is further to communicate the positional profile via the network interface.

8. The apparatus of claim 7, wherein communicating the positional profile comprises verifying a security token.

9. The apparatus of claim 1, wherein the mechanical structure is a tesselatable solid.

10. The apparatus of claim 1, wherein the processor circuit is further to participate as a compute node in a parallel computation of a geometry of the container.

11. The apparatus of claim 10, wherein the geometry is a three-dimensional geometry.

12. The apparatus of claim 10, wherein the geometry is a two-dimensional geometry.

13. The apparatus of claim 10, wherein the processor circuit is further to participate in a parallel computation of a volume of the container.

14. A pourable smart matter comprising:
    a plurality of compute nodes, the compute nodes comprising:
        a mechanical structure having a plurality of faces, the faces having abutting face detectors;
        a network interface;
        a processor circuit; and instructions encoded within a memory to instruct the processor circuit to:
identify a neighbor compute node abutting at least one of the faces; and
build an individual positional profile based at least in part on the identifying; and
determine a distance to a facing edge of a container holding the apparatus, comprising determining a number of similar compute nodes disposed between the compute node and the facing edge.

15. The pourable smart matter of claim 14, wherein the compute nodes are peers.

16. The pourable smart matter of claim 14, wherein at least one of the compute nodes is designated as a master node.

17. The pourable smart matter of claim 16, wherein the master node is to collect a full geometry of a container holding the pourable smart matter.

18. The pourable smart matter of claim 16, wherein the master node collects a geometry of any node touching the master node.

19. The pourable smart matter of claim 14, wherein the compute nodes are substantially uniform.

20. One or more tangible, non-transitory computer-readable mediums having stored thereon executable instructions for instructing a processor to provide a positional engine for a compute node, the instructions to:
identify a neighbor compute node abutting at least one face of a host compute node for the positional engine;
build an individual positional profile for the host compute node based at least in part on the identifying; and
determine a distance to a facing edge of a container holding the compute node, comprising determining a number of similar compute nodes disposed between the apparatus and the facing edge.

21. The one or more tangible, non-transitory computer-readable mediums of claim 20, wherein the processor is to build the individual positional profile based at least in part on an input from an orientation sensor of the host compute node.

22. The one or more tangible, non-transitory computer-readable mediums of claim 21, wherein the orientation sensor is sensitive to at least two axes.

23. The one or more tangible, non-transitory computer-readable mediums of claim 21, wherein the orientation sensor is to determine at least an upward orientation.

\* \* \* \* \*